United States Patent [19]
Habegger

[11] Patent Number: 5,894,415
[45] Date of Patent: Apr. 13, 1999

[54] FAULT TOLERANT POWER SUPPLY INCLUDING A SWITCHING MECHANISM FOR CONTROLLING THE OPERATION OF PLURAL VOLTAGE CONVERTERS IN RESPONSE TO CHANGING INPUT VOLTAGE LEVELS

[75] Inventor: Kenneth Leon Habegger, Naperville, Ill.

[73] Assignee: Lucent Technologies, Inc., Murray Hill, N.J.

[21] Appl. No.: 08/985,515

[22] Filed: Dec. 5, 1997

[51] Int. Cl.$^6$ .................................. H02H 7/00; H02J 1/00
[52] U.S. Cl. .................................. 363/65; 307/85
[58] Field of Search .................... 363/65, 71; 307/45, 307/58, 71, 82, 85

[56] References Cited

U.S. PATENT DOCUMENTS 5,179,510  1/1993  Tokiwa et al. ........................ 363/65
5,548,463  8/1996  Aldridge et al. ..................... 363/65
5,644,175  7/1997  Galm .................................. 307/85

Primary Examiner—Matthew Nguyen

[57] ABSTRACT

A fault tolerant power supply system in which one or more controllers are connected to a battery plant providing a plurality of independent battery power feeds. Each controller includes a microprocessor which provides supervisory control signals to independently operating redundant power converters. Each power converter is provided with an input switching circuit which automatically disconnects the converter from its battery source when the converter input voltage falls below a preset minimum magnitude, thus protecting the battery against deep discharge conditions. When input voltage is removed from the converter, it is disabled so that power continues to be provided to the output load by the other converter(s) which continue to receive input power. When the input voltage is restored to a disabled converter, it is re-enabled only after a predetermined time delay elapses to insure that the input circuit is adequately pre-charged before operation resumes.

15 Claims, 3 Drawing Sheets

5,894,415

FAULT TOLERANT POWER SUPPLY INCLUDING A SWITCHING MECHANISM FOR CONTROLLING THE OPERATION OF PLURAL VOLTAGE CONVERTERS IN RESPONSE TO CHANGING INPUT VOLTAGE LEVELS

FIELD OF THE INVENTION

This invention relates to fault tolerant electronic power supply systems and more particularly to electronic power supplies implemented with redundant components to increase the reliability with which power is provided to a connected load.

BACKGROUND

It is frequently desirable to provide a highly reliable source of power for electronic equipment. Computer and communication systems which supply critical services are therefor frequently powered by power sources whose reliability is enhanced by the use of redundant electronic components and/or standby battery power. It is also desirable to protect both batteries and connected circuitry from damaging currents which can exist in the event of circuit failure or other effects while, to the extent possible, maintaining a continuous supply of output power. It is also desirable to provide fault condition detection and signaling mechanisms which alert both locally and remotely-located maintenance personnel when trouble conditions occur, identifying the location and nature of the problem being experienced.

BRIEF SUMMARY OF THE INVENTION

It is a principal object of the present invention to better coordinate the operation of redundant power conversion circuits, each of which is connected to its own independent battery supply, under conditions in which a low battery terminal voltage condition is detected on one or more of the power feed lines which supply electrical energy to the connected power conversion circuit.

As contemplated by the invention, each battery is protected by temporarily disabling and disconnecting the power converter connected to a battery supply which is experiencing a low terminal voltage condition to protect the battery from a potentially damaging high discharge, and thereafter automatically reconnecting and restarting the disabled power converter in a timed manner when the detected battery terminal voltage is restored to its proper level.

In accordance with a principal feature of the invention, a plurality of redundant and concurrently operating power converters are connected to supply electrical energy to a single load. Each converter is provided with a low input voltage detection circuit which senses a voltage magnitude on the input power feed line which is below a predetermined threshold magnitude, indicating a battery discharge which may be potentially damaging to the battery. In accordance with the invention, protection circuitry disconnects and disables the power conversion circuit which is experiencing the sensed difficulty, thus protecting both the battery and the connected circuitry from potential damage. As contemplated by the invention, when the trouble condition is cleared and the input voltage level is restored and maintained above a second level for a predetermined duration adequate to insure that the input circuit is pre-charged, the previously disabled converter is re-enabled such that electrical energy is again jointly supplied to the connected utilization circuit by the redundant power converters.

Preferably, the present invention is implemented by a control processor which is powered from an independent power source and which receives status signals from sensing circuits connected to the input circuit of each of the redundant power converters. The control processor enables and disables each of the connected converters in response to these status signals, and produces both local and remote warning signals to alert operating personnel when trouble conditions occur.

These and other objects, features and advantages of the present invention will be made more apparent by the following detailed description of a preferred embodiment of the invention. This description is presented in conjunction with the attached drawings.

DETAILED DESCRIPTION

Figure 1:
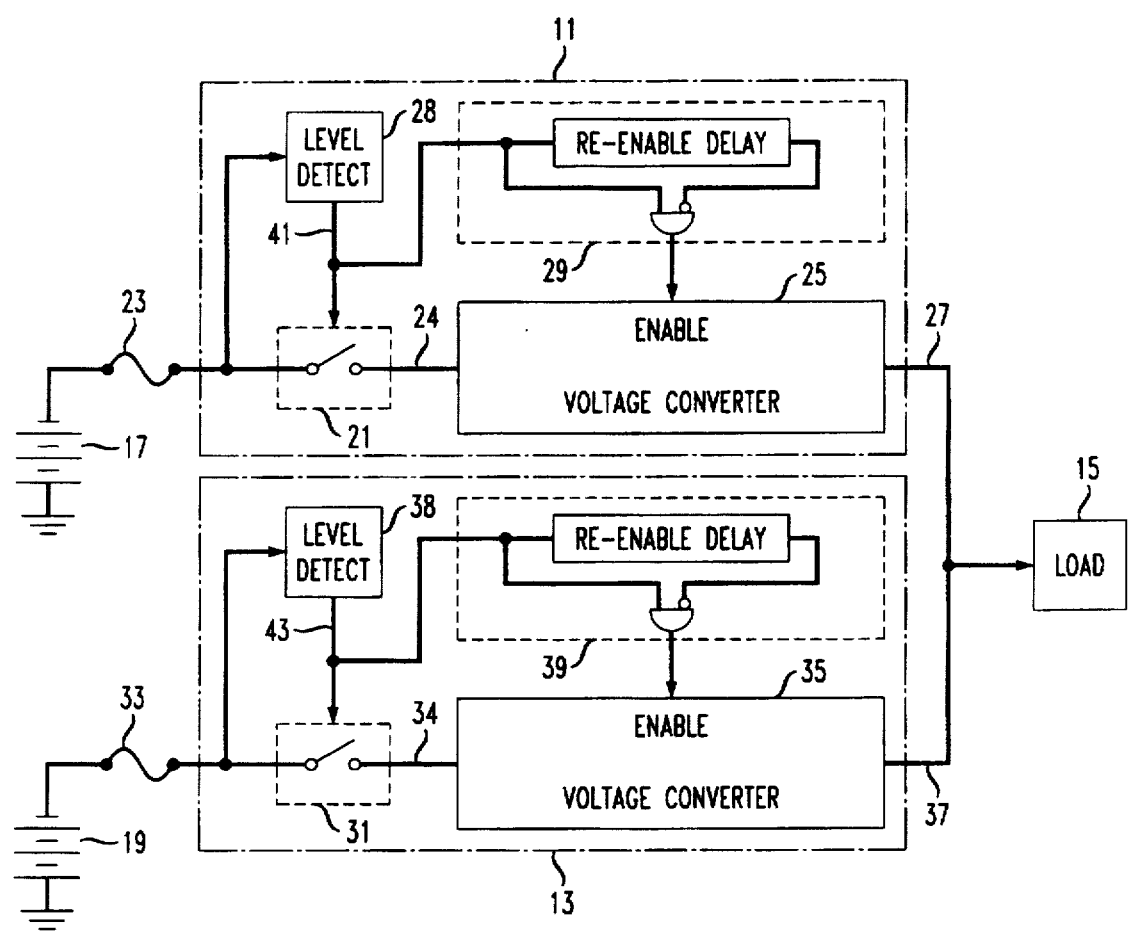
FIG. 1 is a block diagram illustrating the general organization and layout of the preferred embodiment.

FIG. 1 shows a pair of redundant, independently operating power conversion units 11 and 13, both of which supply output power concurrently to a single load 15. Each of the units 11 and 13 obtains input power from its own separate source of power as illustrated in FIG. 1 at 17 and 19 respectively. The power sources 17 and 19 are shown as batteries, although in practice, each source may take the form of a battery and an active power source, or an active power source alone. The present invention may be used to particular advantage to protect batteries against damage which may well occur under low supply battery terminal voltage conditions which result from battery charger failures or other causes.

The power conversion unit 11 includes a cutoff switch 21 which receives power from source 17 via a fuse 23 and supplies energy to the input line 24 of a voltage converter 25. An output line 27 from the converter 25 is connected to the load 15. The power conversion unit 11 further includes an input voltage level detector 28 and a delay unit 29 which together control the cutoff switch 21 and the converter 25 in the manner discussed below. Similarly, the power conversion unit 13 includes a cutoff switch 31 which transfers power from the source 19 via a fuse 33 to the input line 34 of a voltage converter 35. An output line 37 from the converter 35 is also connected to the load 15 so that both units 11 and 13 normally operate concurrently to share the task of supplying power to load 15. The unit 13 further includes an input voltage level detector 38 and a delay unit 39 for controlling the input switching circuit 31 and the converter 35.

The fuses 23 and 33 are conventional and are designed to disconnect the units 11 and 13 from the sources 17 and 19 respectively whenever the magnitude of sustained input current flowing through the fuses exceeds a predetermined maximum current. While such fuses provide effective protection, they are unable to sense input low terminal voltage conditions which can damage the battery and other connected components. In addition, when a blown fuse opens the input circuit and totally removes the input voltage from the input circuit, it is desirable to provide a mechanism for disabling the connected voltage converter so that it is effectively disconnected from the output load.

The present invention utilizes the voltage level threshold detectors 28 and 38 to sense the magnitude of the input voltage being delivered by the connected power source. If, for example, the voltage on the input line from fuse 23 is lower than a predetermined minimum threshold level, the level detector 28 provides a turn-off signal to output terminal 41 to open switch 21 and disconnect the voltage converter 25 from the fuse 23. At the same time, the delay logic unit 29 immediately disables the voltage converter 25 so that it no longer supplies output power via output line 27 to the load 15, which is thereafter powered by the redundant unit 13 alone. Similarly, if the voltage being delivered to the unit 13 falls below the predetermined minimum, the level detector 38 provides a turn-off signal at output terminal 43 to open the switching circuit 31 and disconnect the converter 35 from the fuse 33 while, at the same time, the delay logic unit 39 immediately disables the converter 35. Note that the threshold detectors 28 and 38 also detect a blown fuse (at 23 and 33 respectively) which creates a low input voltage condition at the input to the connected power converter.

The level detectors 28 and 38 may, for example, include a 2.5 volt precision reference voltage provided by a Zener diode or the like (not shown) which is compared with a corresponding voltage level derived from the input potential to the circuit pack. If the voltage input is high, the 2.5 v reference is below the comparison voltage derived from the input line, the input line remains connected, and the voltage converter which it supplies is active. As the voltage input declines and the comparison voltage decreases below the 2.5-volt level, the level detector opens the input switching circuit, disconnecting the voltage converter from its input power feed, preventing the battery from a sustained deep discharge, disabling the connected converter, and isolating the converter from the remaining circuitry.

When input power is restored, the disabled converter is automatically reconnected and re-enabled by a programmed dual restart procedure. By way of example, if a blown fuse 23 is replaced by service personnel to restore power to the input to the conversion unit 11, the level detector 28 senses that the input voltage has risen above the minimum threshold level and produces a turn-on signal at terminal 41. This signal immediately closes cutoff switch 21 so that power is restored at the input of voltage converter 25. The delay unit 29 applies the turn-on signal to the enable terminal of converter 25 to re-enable the operation of converter 25 only after a predetermined delay interval elapses during which input power is continuously applied to the converter input 24. This delayed re-enablement of the voltage converter allows adequate time for the input feed lines to be completely recharged to quiescent levels before the voltage converter 25 resumes the delivery of power to the load 15. Similarly, the level detector 38 and delay unit 39 in the power conversion unit 13 provide for the immediate re-connection and delayed re-enablement of the voltage converter 35.

Figure 2:
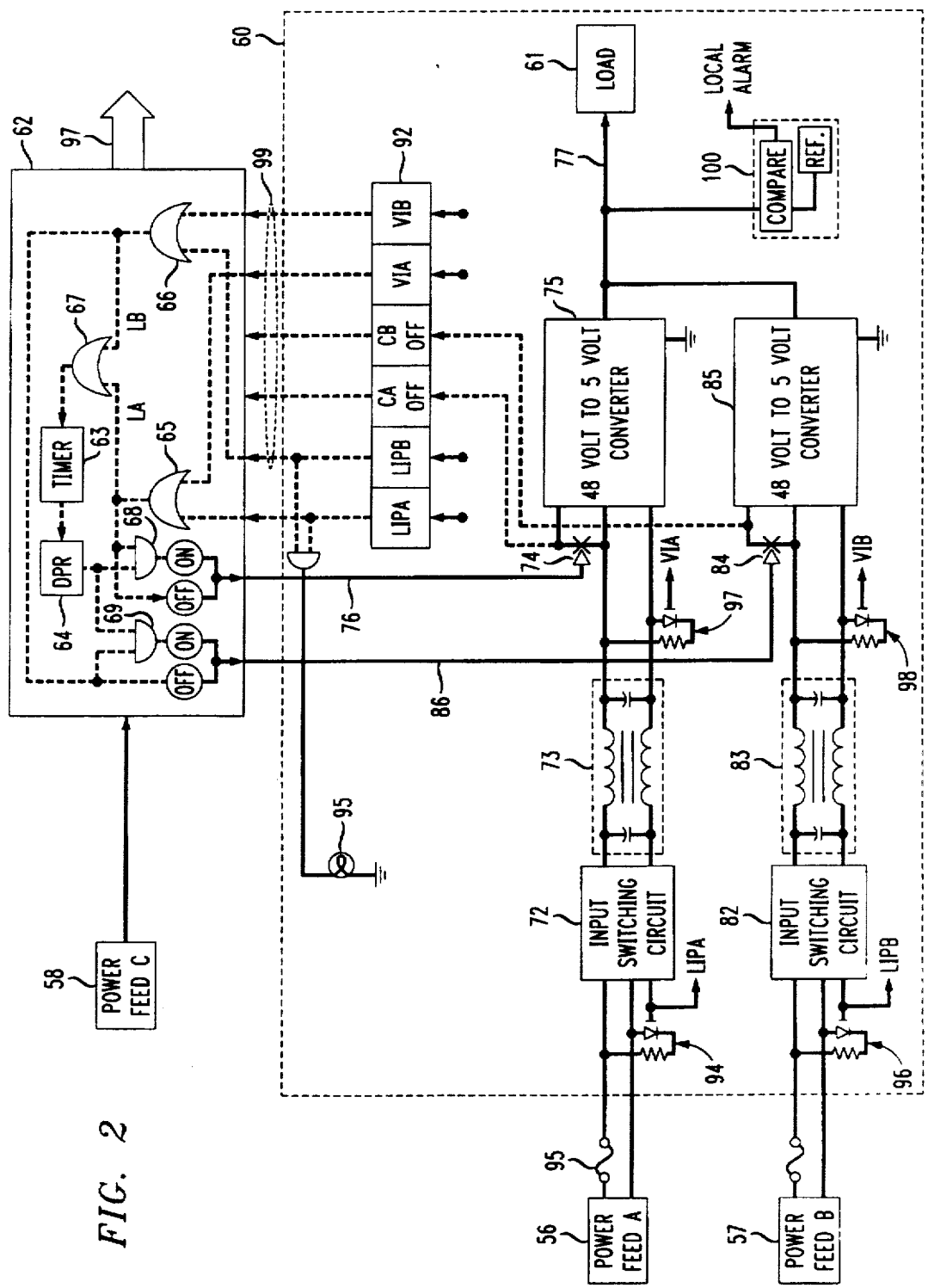
FIG. 2 is a detailed block diagram which schematically illustrates the interconnections between the various components used to implement the preferred embodiment.

The preferred embodiment of the invention is shown in complete detail in FIG. 2 of the drawings. A unit 60 includes an electrical load 61 which is powered from two independent power sources: power feed A at 56 and power feed B at 57 which supply input power nominally at −48 volts. An independent power feed C at 58 provides 5 volt power to operate the a supervisory controller 62 which is external to the unit 60.

The controller 62 takes the form of a microcontroller which implements, among other functions, a timer 63, means for storing and manipulating state signals including a "dual power restart" flag value DPR indicated at 64, and means for monitoring exterior signals as illustrated in FIG. 2 by the logic gates 65 through 69. The operation of the controller 62 will be described below, following a description of the other principal components of the system.

The embodiment of the invention shown in detail in FIG. 2 may be employed to advantage to reliably supply electrical power to frames of electronic communications equipment in a telephone facility. Battery plants consisting of a plurality of charged batteries are connected to the frames by parallel power feed lines. Each power conversion unit should cut itself off from its connecting feed line in the event the potential on that feed line falls below a nominal 38.5 volts, and must definitely cutoff below 37.5 volts to prevent the connected battery from going into deep discharge. Two or more voltage converters, such as those seen at 75 and 85 in FIG. 2, operate together under the supervisory control provided by the controller 62.

As seen in FIG. 2, the supply voltage from power feed A at 56 passes through an input switching circuit 72 and a common mode filter 73 to the input of the 48 volt to 5 volt converter 75 which delivers energy via the power output line 77 to the communications equipment being powered, represented in FIG. 2 by the load 61. A second voltage converter 85 in the unit 60 receives power from power feed B at 57 and also supplies energy to the output line 77. This second voltage converter receives power via an input switching circuit 82 and a filter 83 connected between the power feed 57 and the voltage converter 85.

The unit 60 operates under the supervisory control of the controller 62 which receives information on the operational state of the unit 60 from a status register indicated at indicated at 92 in the unit 60. Register 92 is used to store status bits, each of which has an "0" state during normal operation and a "1" state to indicate abnormal operation. The content of register 92 includes bits designated symbolically as LIPA, LIPB, CA-OFF, CB-OFF, VIA and VIB.

The LIPA bit is set to a "0" in the normal condition when the voltage from power feed A is above a predetermined level and a fuse 95 in the input line from power feed A at 58 is in its normal conductive state. The output of an optical relay 94 is connected to control the input switching unit 72 which opens when the input voltage from power feed A drops below the predetermined level. The LIPA value in status register 92 is set to "1" to indicate a low input potential on the input line from power feed A. The optical relay 94 also opens the switching circuit 72 whenever the input voltage falls below a predetermined threshold level to prevent discharge from damaging the battery in power feed A.

Similarly, an optical relay 96 connected across the input lines from power feed B normally holds the input switching circuit 82 closed and sets the bit LIPB in the status register 92 to "0" to indicate that the input voltage from feed B is above the predetermined minimum. Optical relay 96 opens switching circuit 82 and sets the LIPB bit to "1" whenever the input voltage from power feed B falls below the predetermined threshold voltage.

Optical relays indicated at 97 and 98 set the bits VIA and VIB bits respectively in register 92 to "0" when the desired voltage appears at the input terminals of the voltage converters 75 and 85 respectively. The VIA bit in register 92 is "0" when the input switching circuit 72 is closed but is set to "1" in the abnormal condition when the input switching circuit 72 is open. Likewise, bit VIB in register 92 is "0" or a "1" when switching circuit 82 is closed and open respectively. The VIA and VIB bits thus confirm that the switching circuits 72 and 82 are operating correctly in response to the low input voltage condition detection as indicated by the LIPA and LIPB bits.

When either one of the input voltage level detectors 94 or 96 detects a low voltage condition, as indicated by either the LIPA or LIPB bits being set to a "1", a low input power (LIP) light emitting diode seen at 95, mounted on the external faceplate of the controller 60 turns on, indicating that a low voltage has been detected on at least one of the feeders.

The content of the status register 92 is communicated via the leads 99 to the controller 62 which supervises the operation of the voltage converters 75 and 85 and transmits warning signals to a remote location when trouble conditions are detected. The controller 62 preferably takes the form of a microcontroller which processes the input status signals received via lines 99 from the register 92. Although functions performed by the controller 62 have been shown being performed by logic gates 65 through 69 for purposes of illustration, it should be understood that all such functions may in practice be advantageously performed by a programmed microcontroller.

When either of the bits LIPA or VIA in register 92 is set to "1" to indicate a loss of an adequately high input voltage to the converter 75 from power feed A, the output LA of an OR gate 65 also becomes "1" and sends an OFF signal via line 76 to turn OFF relay 74 to disable converter 75. Similarly, when either LIPB or VIB is set to a "1," an OR gate 66 produces the signal LB which causes an OFF signal to be sent via signal line 86 to open the relay 84 and disable power converter 85. In both cases, the OFF status of the converter is indicated by the corresponding status bits CA-OFF and CB-OFF in status register 92.

An OR logic gate 67 combines the LA and LB signals from the outputs of gates 65 and 66 and accordingly is a "1" whenever any of the low input status bits LIPA, LIPB, VIA or VIB is a "1". The output of gate 67 is timed by a timer 63 which establishes a control value DPR in the single bit register 64. The DPR ("Dual Power Restart") value provides an indication when all of the status bits have been in their normal "0" condition for a predetermined time duration established by the timer 63. A logic gate 68 connected to receive the LA and DPR signals provides a turn ON signal to line 76 to close relay 74 and re-enable the converter 75 only when the LA signal is a "0" (indicating that adequate input voltage is present from power feed A) and when the DPR value indicates that the input voltages have been maintained at an adequate level for the duration established by timer 63. In the same way, logic gate 69 is operated by the LB and DPR signals to provide a turn ON signal via line 86 to relay 84 to re-enable converter 85 only when adequate input voltage levels from power feed B are present and have been present for the duration determined by timer 63. A 30 second delay interval is typically sufficient to permit the trouble affected feeder from a battery plant to be recharged.

Figure 3:
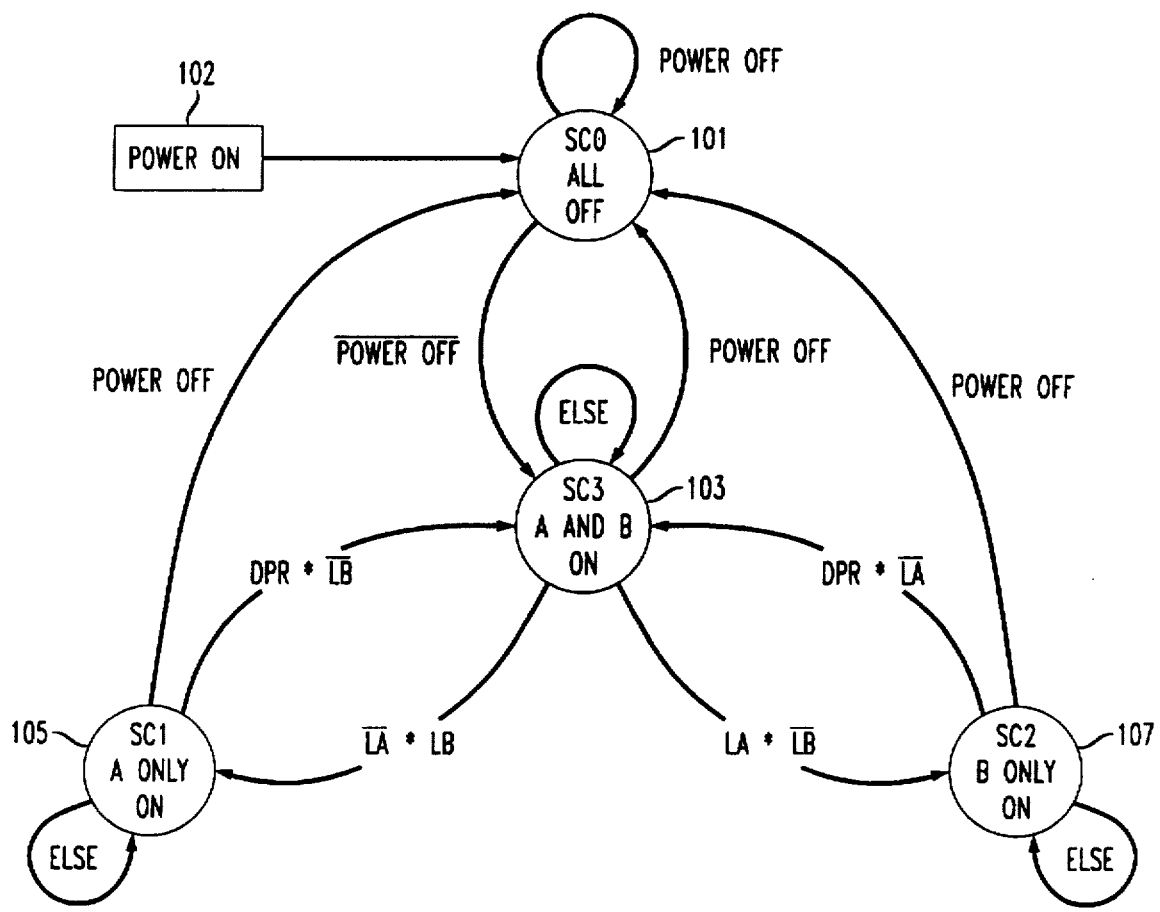
FIG. 3 is a state diagram which depicts the various states assumable by the arrangements shown in FIGS. 1 and 2 and the transitions between those states.

The various states assumable by arrangement shown in FIG. 2, and the transitions between those states, are shown in FIG. 3. When the unit 60 is plugged into its location in the frame, the controller 62 which implements the state machine is powered by the 5 volt power feed C at 58 which is independent from the 48-volt power feeds 56 and 57. The initial state SC0 indicated at 101 in FIG. 3 is entered when the controller 62 is powered on and constitutes the OFF state for unit 60. When the ON pushbutton on the front panel of the unit 60 is pressed as illustrated in FIG. 3 at 102, an internal status indication (not shown) in the controller 62 named POWER OFF goes low which causes the state machine to enter state SC3 seen at 103, at which time both the voltage converters 75 and 85 are turned ON by signals applied to the relays 74 and 84 respectively by the controller 62. If all of the input conditions are normal, the status values LIPA, LIPB, VIA and VIB in register 92 are "0" indicating full voltage is available from the both voltage feeds and at both converter inputs, and the values CA-OFF and CB-OFF are both "0," indicating that both converters are enabled. As long as the normal 48 volts continues to be detected at the input to both converters 75 and 85, the controller remains in the SC3 state 103 with each converter providing about one-half the current requirement for the load 61 connected to the output power line 77.

If a 48-volt input goes below a nominal 38.5 volts (for example, power feed A at 56), the low input voltage is detected by the input switching circuit 72 as detected by the optical relay 94 to set LIPA to "1", causing LA to be set to "1" and the controller 92 changes to state SC2 indicated at 107 in FIG. 3, in which converter 75 is disabled as indicated by CA-OFF. In state SC2, only power feed B supplies output power to the output line 77.

It is important that a disabled voltage converter not be immediately restarted before the input feed line has been fully recharged. A delayed turn-on of the DC-to-DC converters 75 and 85 takes place under the control of the controller 62 which generates a dual power restart signal (DPR) after a timed interval has elapsed after input power is restored to the OFF converter.

If, for example, the fuse 95 had opened on the line from power feed A at 56 for some reason, maintenance personnel would pre-charge the feeder and replace the fuse. Upon exceeding the nominal 38.5 volt potential (some hysteresis is provided so it is more like 40 volts) 1), the detector 94 would sense the return of input voltage, close the switching circuit 72, the detector 97 would detect the restoration of full input voltage to the converter 75. Since both the LIPA and VIA status bits would return to "0" to indicate normal operation, the LA signal at the output of gate 65 would return to "0". No turn ON signal would be applied, however, until timer 63 indicated that a sustained "0" output from gate 67 had been present for a preset time. The value DPR would be set to indicate that a restart may occur. The combination of the DPR and LA signals detected by gate 68 would accordingly issue a turn ON signal via line 76 to restart converter 75 and the unit 60 would return to state SC3 at 103 with both converters 75 and 85 operating.

When a low input potential is detected and power is cutoff from one of the voltage converters 75 and 85, a trouble condition indication is transmitted to a remote supervisory location over a transmission path 97 from controller 62 so that the trouble condition can be logged, listed on a remote output printer, and/or otherwise manifested such that a remote site is made aware of the problem. Note that the low input power indicator LED 95 will also light if a fuse blows.

but that event will trigger additional conventional alarms. The arrangement contemplated by the invention thus provides a visual indication at each equipment frame of its state so that maintenance personnel can readily identify the affected unit. In the meantime, the operative voltage converter continues to operate on the good feeder independent of one of the feeders being cutoff. Further, an output level alarm indicated at 100 produces a local and/or remote alarm indication in the event the voltage on the output line 77 falls below a preset minimum magnitude. If the battery plant for some reason becomes unable to charge some of its batteries, the connected controllers will remain active as long as possible, with the alarm sensor 100 being activated when neither of the voltage converters is able to provide the desired output voltage level to output line 77.

It should be understood that the embodiment of the invention which has been described is merely illustrative of one application of the principles of the invention. Numerous modifications may be made to the methods and structures which have been described without departing from the invention.

What is claimed is:

1. An electronic power supply for reliably providing an electrical potential to a utilization circuit from at least first and second independent power sources, said power supply comprising, in combination, first and second power converters each having a power input port and a power output port, means coupling the power output port of both said first and said second power converters to jointly supply electrical energy to said utilization circuit when both of said power converters are operative, a first input circuit for coupling said input port of said first power converter to said first power source, a second input circuit for coupling said input port of said second power converter to said second power source, a first detector connected to said first input circuit for detecting a first abnormal voltage condition in said fist input circuit, means coupled to said first detector for disabling said first converter in response to the detection of said first abnormal voltage condition such that electrical energy is supplied to said utilization circuit solely by said second power converter, timing means coupled to said first detector for enabling said first converter when said first converter is disabled only after said first abnormal voltage condition is absent for a predetermined time duration, a second detector connected to said second input circuit for detecting a second abnormal voltage condition in said second input circuit, means coupled to said second detector for disabling said second converter in response to the detection of said second abnormal voltage condition such that electrical energy is supplied to said utilization circuit only by said first power converter, and timing means coupled to said second detector for enabling said second converter when said second converter is disabled only after said second abnormal voltage condition is absent for a predetermined time duration.

2. An electronic power supply as set forth in claim 1 wherein said first and said second abnormal voltage conditions are voltage magnitudes lower than a predetermined minimum magnitude.

3. An electronic power supply as set forth in claim 1 wherein said first and second power sources include batteries having output terminals which are subject to probable damage when discharged below said predetermined minimum magnitude.

4. An electronic power supply as set forth in claim 1 further including an indicator for producing a warning signal whenever either said first or said second power converter is disabled.

5. An electronic power supply as set forth in claim 4 wherein said warning signal consists of a visual warning indicator.

6. An electronic power supply as set forth in claim 4 wherein said indicator includes communications means for transmitting said warning signal to remotely located means for manifesting a trouble condition.

7. An electronic power supply as set forth in claim 6 wherein said warning signal specifies which one of said first and said second power converters has been disabled in response to an abnormal voltage condition.

8. A reliable electronic power supply comprising a plurality of independently operating units for supplying power to a single load, each given one of said units comprising, in combination, a separate power source of electrical energy associated with said given unit;

a voltage converter having an input port for receiving electrical energy at an input voltage from said separate power source and an output port for supplying energy to said load at a predetermined output voltage, means responsive to a first control signal for disabling the operation of said converter, means responsive to a second control signal for enabling the operation of said converter, and an input circuit for connecting said input port to said power source, said input circuit comprising:

a threshold detector for producing said first control signal whenever said input voltage is less than a first predetermined threshold voltage, and for producing said second control signal whenever said first input voltage is greater than a second predetermined threshold level, switching means for disconnecting said input port from said power source in response to said first control signal, and time delay switching means for reconnecting said input port to said power source after a predetermined time interval elapses following the production of said second control signal.

9. An electronic power supply as set forth in claim 8 wherein said separate power source associated with each of said independently operating units includes a battery which is subject to probable damage when discharged below said first predetermined threshold voltage.

10. An electronic power supply as set forth in claim 8 further including an indicator for producing a warning signal whenever either a first control signal is produced by one of said independently operating units.

11. An electronic power supply as set forth in claim 10 wherein said warning signal consists of a visual warning indicator.

12. An electronic power supply as set forth in claim 10 wherein said indicator includes communications means for transmitting said warning signal to remotely located means for manifesting a trouble condition.

13. An electronic power supply as set forth in claim 12 wherein said warning signal specifies which one of said first and said second power converters has been disabled in response to an abnormal voltage condition.

14. A method for controlling the operation of a plurality of redundant voltage converters all of which concurrently supply electrical energy to a single utilization circuit, said method comprising, in combination, the steps of:

providing a separate source of an electrical potential to each of said voltage converters, monitoring the magnitude of said potential at each from each of said sources, connecting each given one of said sources to an associated one of said power converters whenever the magnitude of the potential supplied by said given source has exceeded a predetermined minimum magnitude for a predetermined minimum time duration, and disconnecting said given source from said associated power converter whenever the magnitude of the potential supplied by said given source falls below said predetermined magnitude, whereby a detected low potential from a particular one of said sources causes the connected power converter to be immediately disconnected and thereafter a restored and sustained high potential from said particular sources causes the automatic reconnection of the previously disconnected converter.

15. The method for controlling the operation of a plurality of redundant voltage converters set forth in claim 14 wherein each of said sources includes at least one battery which is subject to damage from excessive discharge conditions manifested by a battery potential below said predetermined magnitude.

\* \* \* \* \*